United States Patent [19]
Ai

[11] Patent Number: 5,161,072
[45] Date of Patent: Nov. 3, 1992

[54] INFORMATION RECORDING/REPRODUCING APPARATUS FOR RECORDING INFORMATION AND VERIFYING RECORDED INFORMATION

[75] Inventor: Takaharu Ai, Osaka, Japan

[73] Assignee: Matsushita Electric Industrial Co., Ltd., Osaka, Japan

[21] Appl. No.: 602,572

[22] Filed: Oct. 24, 1990

[30] Foreign Application Priority Data

Oct. 27, 1989 [JP] Japan ............................ 1-280901

[51] Int. Cl.⁵ ...................... G11B 5/09; G11B 27/36; G11B 3/90
[52] U.S. Cl. .............................. 360/53; 360/31; 369/53
[58] Field of Search ................ 360/31, 52, 53, 54, 360/74.1; 369/53, 54; 364/970, 970.1, 970.2

[56] References Cited

U.S. PATENT DOCUMENTS

| | | | |
|---|---|---|---|
| 3,550,103 | 12/1970 | Cogar | 340/174.1 |
| 4,611,314 | 9/1986 | Ogata et al. | 369/32 |
| 4,637,023 | 1/1987 | Lounsbury et al. | 360/53 |

FOREIGN PATENT DOCUMENTS

59-146466  8/1984  Japan.
61-123062  6/1986  Japan.
63-195877  8/1988  Japan.

*Primary Examiner*—Aristotelis Psitos
*Assistant Examiner*—Won Tae C. Kim
*Attorney, Agent, or Firm*—Lowe, Price, LeBlanc & Becker

[57] ABSTRACT

An information recording/reproducing apparatus having a function to verify recorded information. A controller of the apparatus divides information to be recorded into two or more portions so that the first division portion is successively recorded over a first group of a plurality of blocks formed circumferentially on a disc-like recording medium and then reproduced for verification, before the second division portion is successively recorded over a second group of blocks which are consecutive to the first group of blocks and then reproduced for the verification, the recording and reproduction being continuously effected up to the last division portion. When verifying the first division portion through the penultimate division portion, only the final group of one or more blocks of the blocks of the just recorded division portion are not verified immediately but, after the recording for a subsequent division portion, verified together with the blocks of the subsequent division portion other than final group of one or more blocks of the subsequently recorded division portion. All blocks of the last division portion reproduced for verification are verified together with previously recorded and non-verified blocks from other division portions.

3 Claims, 4 Drawing Sheets

INFORMATION RECORDING/REPRODUCING APPARATUS FOR RECORDING INFORMATION AND VERIFYING RECORDED INFORMATION

BACKGROUND OF THE INVENTION

The present invention relates generally to information recording/reproducing apparatus, and more particularly to such an information recording/reproducing apparatus for verifying or confirming the information recorded on a disc-like recording medium such as a magnetic disc and an optical disc.

Recently, in accordance with high-speed operation and high performance of computers, high-speed operation and high performance of peripheral equipment are required. Particularly, it is necessary for secondary storages such as a magnetic disc drive and an optical disc drive to reduce the access time while ensuring high reliability so as to increase the data transfer speed and the capacity. Thus, recent approaches involve increasing the rotational speed of the recording medium, reducing the weight of the recording/reproducing head and increasing the track pitch and the frequency for densification or an increase in the recording density. To improve the reliability of data written on the recording medium, it is usually to perform a write-and-verify operation to read out the written data in order to check whether the data is normally readable, whether the number of data errors such as bit inversion is below a standard value and whether the read-out data are correct. A conventional write-and-verity operation for an information recording/reproducing apparatus is described hereinbelow with reference to FIG. 1 for a better understanding of this invention. FIG. 1 illustrates a general arrangement of an optical disc system. In FIG. 1, a controller illustrated at numeral 3 includes a buffer memory 4 for immediately storing data transferred through a host interface 2 from a host computer 1. After the start of the data storage process in the buffer memory 4, the stored data are successively supplied to an EDAC 5 in units of data corresponding to one sector of a disc-like recording medium 8 where an error correction code is added thereto. The EDAC 5 acts as a bit error detection and correction circuit in which a predetermined bit is inserted into the data in accordance with an adequate calculation equation so as to find the error bit position when an error such as the bit inversion occurs on reproduction. Subsequently, the data from the EDAC 5 are supplied through a MODEM 6 to a drive unit 7 so as to be written on the recording medium 8. The MODEM 6 functions as a modulation and demodulation circuit to perform the modulation for recording data onto the optical disc and to perform the demodulation of the signal read out from the optical disc so as to obtain the original data before the recording. The optical disc recording medium has thereon a spiral track or coaxial track. Each track corresponds to one revolution of the optical disc being divided with equal angles into sectors each of which is the minimum recording block (element) and the one-time-recorded data being recorded over a plurality of sectors. A sector address and a track address for indicating the sector position on the optical disc are recorded in advance at the head portion of each of the sectors. For performing the write-and-verify operation, the data stored in the buffer memory 4 are required to be left until the verification is completed for the sector in which the data is written. In response to a problem resulting from verification, the data left in the buffer memory 4 are again transferred to the drive unit 7 so as to be written in a different sector of the recording medium 8. FIG. 2 shows a line of sectors on which data are written. For example, case all data to be recorded is 50 Kbytes, the capacity of the buffer memory 4 is 32 Kbytes and the capacity of each of the sectors on the recording medium 8 is 0.5 Kbytes. Of this 50 Kbytes, the 32 Kbyte data are first transferred thereto from the host computer 1 in FIG. 1. This process is then followed by an interruption of the transferring operation. The 32 Kbyte data stored in the buffer memory 4 are successively transferred to the drive unit 7 so as to be recorded in sectors m to m+63 of the recording medium 8 as illustrated by a in FIG. 2. Subsequently, the controller 3 causes the drive unit 7 to move in a radial direction of the recording medium 8 to perform the seeking operation in which the read-out address is checked to determine whether it is coincident with a target address set at the front side of the record-started sector m, as illustrated by b in FIG. 2. The drive unit 7 reads out the data in the sectors m to m+63 as illustrated by c in FIG. 2. The read-out data are transferred to the controller 3 which in turn, checks the qualities (bit error, level of the read-out signal) of the read-out data for each sector. If there is a problem, the data of buffer memory 4 corresponding to the sector are again transferred to the drive unit 7 to be written into an area disposed as a substitute for the sector. Thereafter, the portion of the buffer memory 4 corresponding to the sector is released. On the other hand, if there is no problem, the subject portion of the buffer memory 4 corresponding to the sector is released. On the other hand, if there is no problem, the subject portion of the buffer memory 4 is directly released. To the released portion of buffer memory 4, the next data are transferred from the host computer 1. After completion of the verification for the sectors m to m+63, the controller 3 causes the drive unit 7 to seek the front side of the sector m+63 as illustrated by d in FIG. 2. Here, during the standby for rotation as illustrated by e in FIG. 2, preparation is made for the next recording operation. Thereafter, the remaining 18 Kbyte data are similarly transferred through the EDAC 5 and the MODEM 6 to the drive unit 7 so as to be recorded in sectors after the sector m+63 as illustrated by f in FIG. 2. Subsequently, in response to a command from the controller, the drive unit 7 seeks the front side of the sector m+64 as illustrated by q in FIG. 2 to read out the recorded data for verification as illustrated by h in FIG. 2. In FIG. 2, illustrations corresponding to the standby for rotation between the seeking b, q and the verification c, h are omitted for brevity.

According to the above-described write-and-verify operation, a quick switching operation to the recording for the sectors after the sector m+63 after the completion of the verification for the sectors m to m+63 becomes difficult because of generation of standby for rotation, generally one and more revolutions. Actually, the undesirable seeking operation and standby operation as illustrated by d and e in FIG. 2 are required. The number of the undesirable operations increases as the data amount increases and the effective capacity of the buffer memory 4 is reduced.

There is another problem which arises with such a write-and-verify operation, however, in that difficultly is encountered to quickly perform the switching operation between the verifying operation and the recording operation, thus standby time for the rotation operation of the recording medium is necessitated deteriorating the performance of the information recording/reproducing apparatus.

SUMMARY OF THE INVENTION

It is therefore an object of the present invention to provide an information recording/reproducing apparatus which is capable of eliminating standby time for the rotation operation of the recording medium.

In accordance with the present invention, there is provided an information recording/reproducing apparatus comprising: recording means for recording information on a disc-like recording medium rotatable by rotating means; reproducing means for reproducing the information recorded on the disc-like recording medium by the recording means; and control means for controlling the recording means and the reproducing means so as to record the information on the disc-like recording medium and reproduce the information recorded thereon for verification of the recorded information, the control means dividing the information to be recorded into two or more portions so that the first division portion is successively recorded over a first group of a plurality of blocks successively formed circumferentially on the disc-like recording medium and then reproduced for verification before the second division portion is successively recorded over a second group of blocks which are consecutive to the first group of blocks and then reproduced for verification, the recording and reproduction being continuously effected up to the last division portion, when verifying the first division portion through the penultimate division portion, only the final group of one or more blocks of the blocks of the just recorded division portion are not verified immediately but, after the recording for a subsequent division portion, verified together with the blocks of the subsequent division portion other than final group of one or more blocks of the subsequently recorded division, and all blocks of the last division portion reproduced for verification are verified together with previously recorded and non-verified blocks from other division portions Preferably, the control mens determines the number of the immediate non-verified blocks of each of the division portions so that the time required for rotation of the disc-like recording medium corresponding to the immediate non-verified blocks is longer than the time required for the next recording preparation after completion of the verification.

BRIEF DESCRIPTION OF THE DRAWINGS

The present invention is described in further detail with reference to the accompanying drawings, in which.

DETAILED DESCRIPTION OF THE INVENTION

Figure 1:
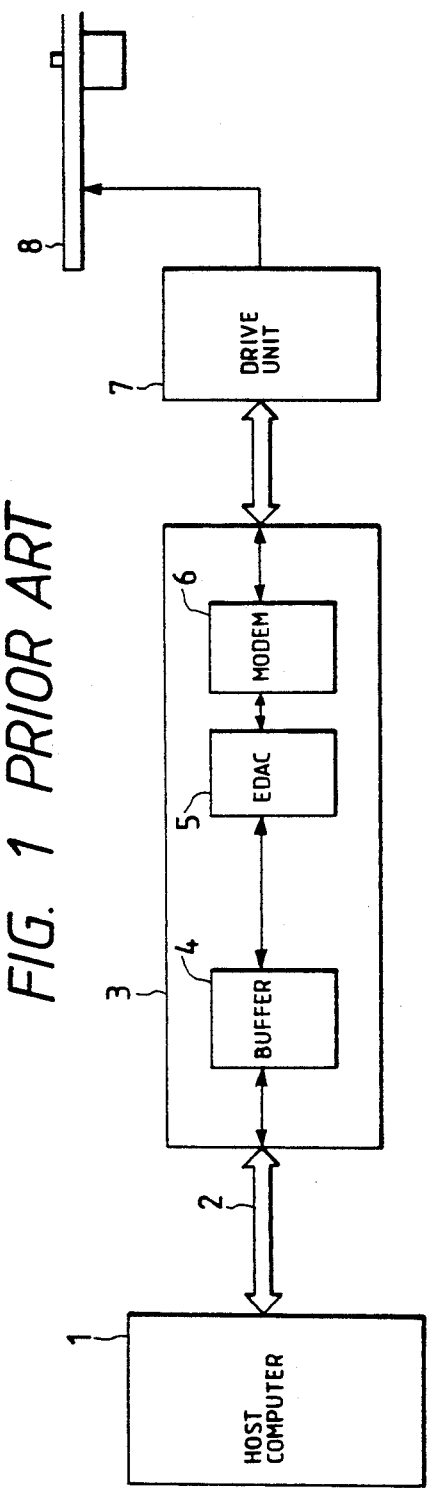
FIG. 1 is a block diagram showing an information recroding/reproducing apparatus equipped with a conventional verification function.
Figure 3:
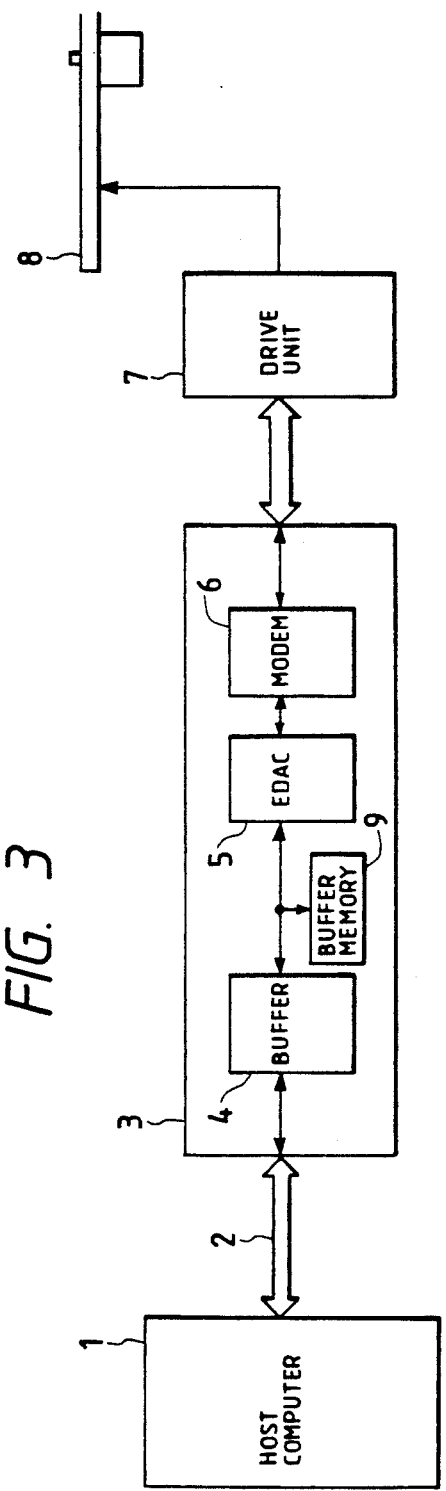
FIG. 3 is a block diagram showing an arrangement of an information recording/reproducing apparatus according to an embodiment of the present invention which includes an improved data verification function.
Figure 2:
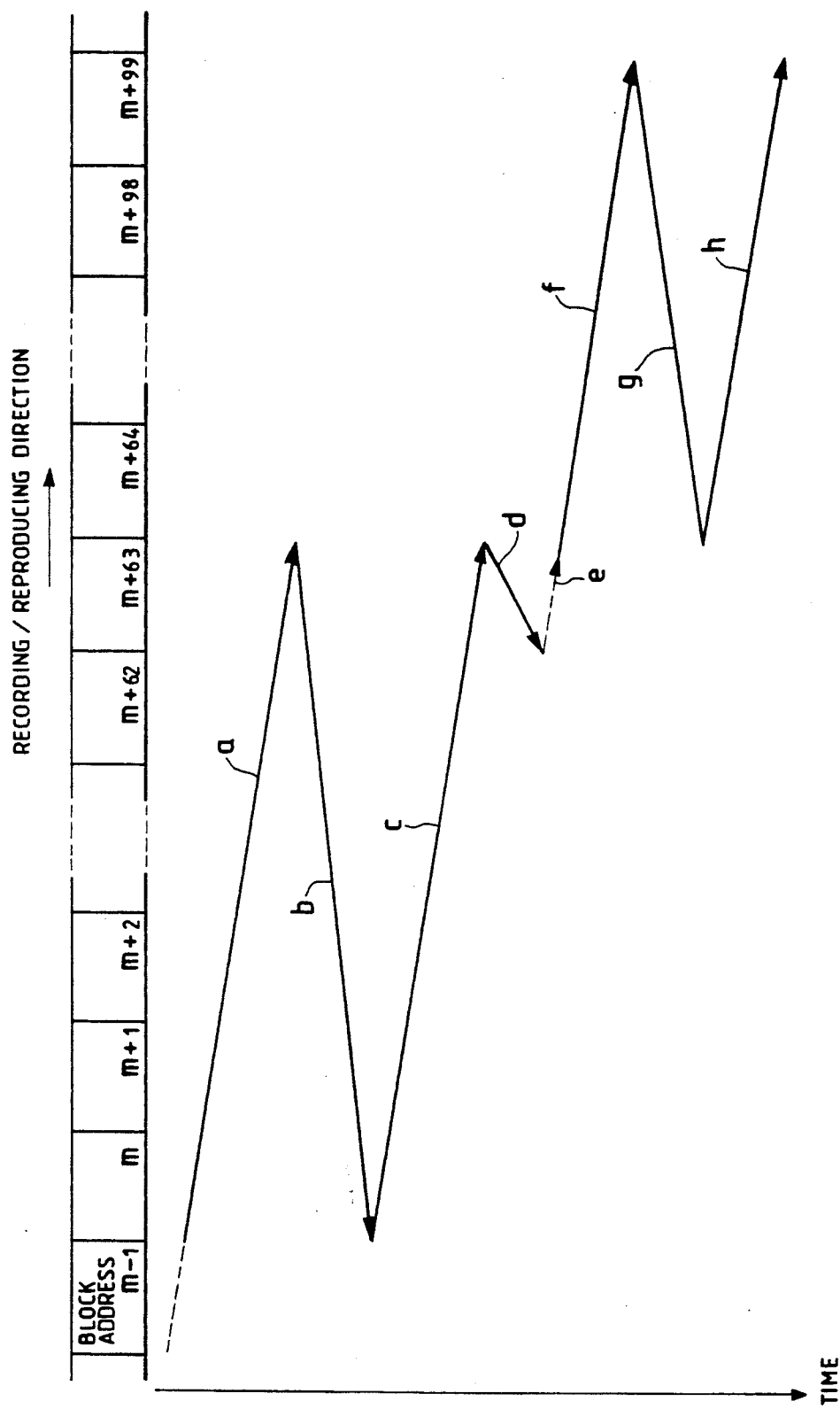
FIG. 2 is a graphic illustration for describing operation of the FIG. 1 information recording/reproducing apparatus.
Figure 4:
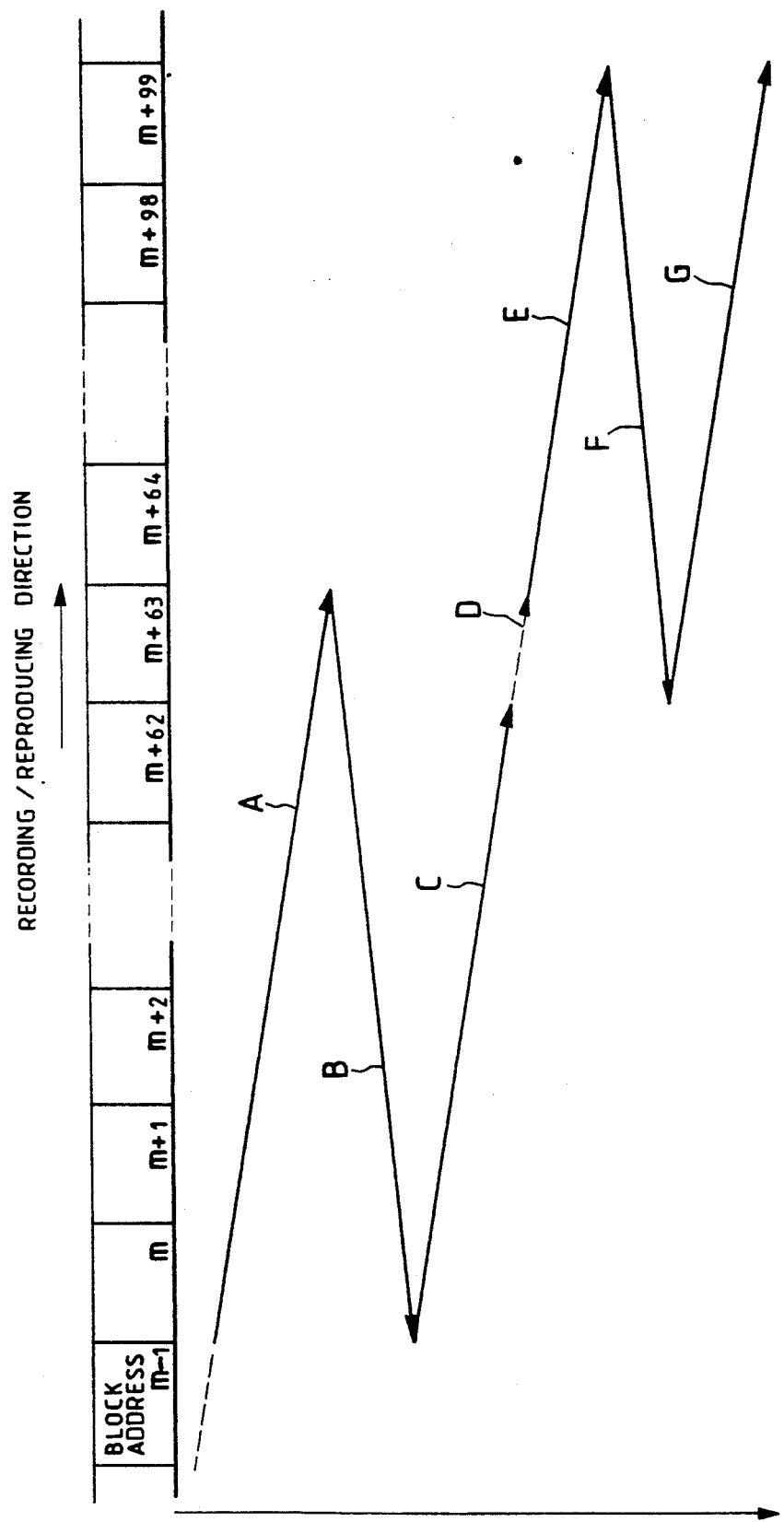
FIG. 4 is a graphic illustration for describing the operation of the FIG. 3 information recording/reproducing apparatus.

Referring now to FIG. 3, there is illustrated an information recording/reproducing apparatus according to an embodiment of the present invention which has a write-and-verify function, where parts corresponding to those in FIG. 1 showing a conventional information recording/reproducing apparatus are marked with the same numerals and the detailed description thereof is omitted for brevity. In FIG. 3, the information recording/reproducing apparatus includes a controller 3 including a buffer memroy 4, and EDAC 5, a MODEM 6 and a verification buffer memory 9. The buffer memory 4 is coupled to a host computer 1 and has a capacity of 32 Kbytes, for example. A write-and-verify operation is described hereinbelow with reference to FIG. 4, for example, under the condition that all data to be recroded is 50 Kbytes. Of this 50 Kbyte data, 32 Kbyte of data are initially transferred from the host computer 1 and then stored in the buffer memory 4 before transferred through the EDAC 5 and the MODEM 6 to a drive unit 7. The drive unit 7 operates a recording/reproducing means, not shown, so as to record the data in sectors m to m+63 of a disc-like recording medium 8, driven by means of a driving mechanism 8', as illustrated by A in FIG. 4. Subsequently, the controller 3 causes the drive unit 7 to seek the front side of the sector m of the recording medium 8 as illustrated by B in FIG. 4 to successively verify the data from the sector m as illustrated by C in FIG. 4. If the time required from completion of the verification to completion of preparation for the next recording operation is coincident with the time required for rotation of the recording medium corresponding to one sector, the controller 3 performs the verfication for the data up to the sector the sector m+63. During the passage of the sector m+63, a preparation for recording data in the sectors after the sector m+63 is made as illustrated by D in FIG. 4. At this time, the data recorded in the sector m+63 are transferred into the verfication buffer memory 9 and the portion of the buffer memory 4 corresponding to the data in the sector m+63 is released. Thereafter, when the recording medium 8 rotates up to a position which allows recording data into the sector m+64, the remaining 18 Kbyte data are recorded over 36 sectors as illustrated by E in FIG. 4. Subsequently, the drive unit 7 seeks the front side of the sector m+63 as illustrated by F in FIG. 4 to verify the data of sector m+63 and the 36 sectors, in which the data are recorded later, as illustrated by G in FIG. 4. In FIG. 4, indications of the standby to be made between the seeking B, F and the verification C, G are omitted.

Figure 5:
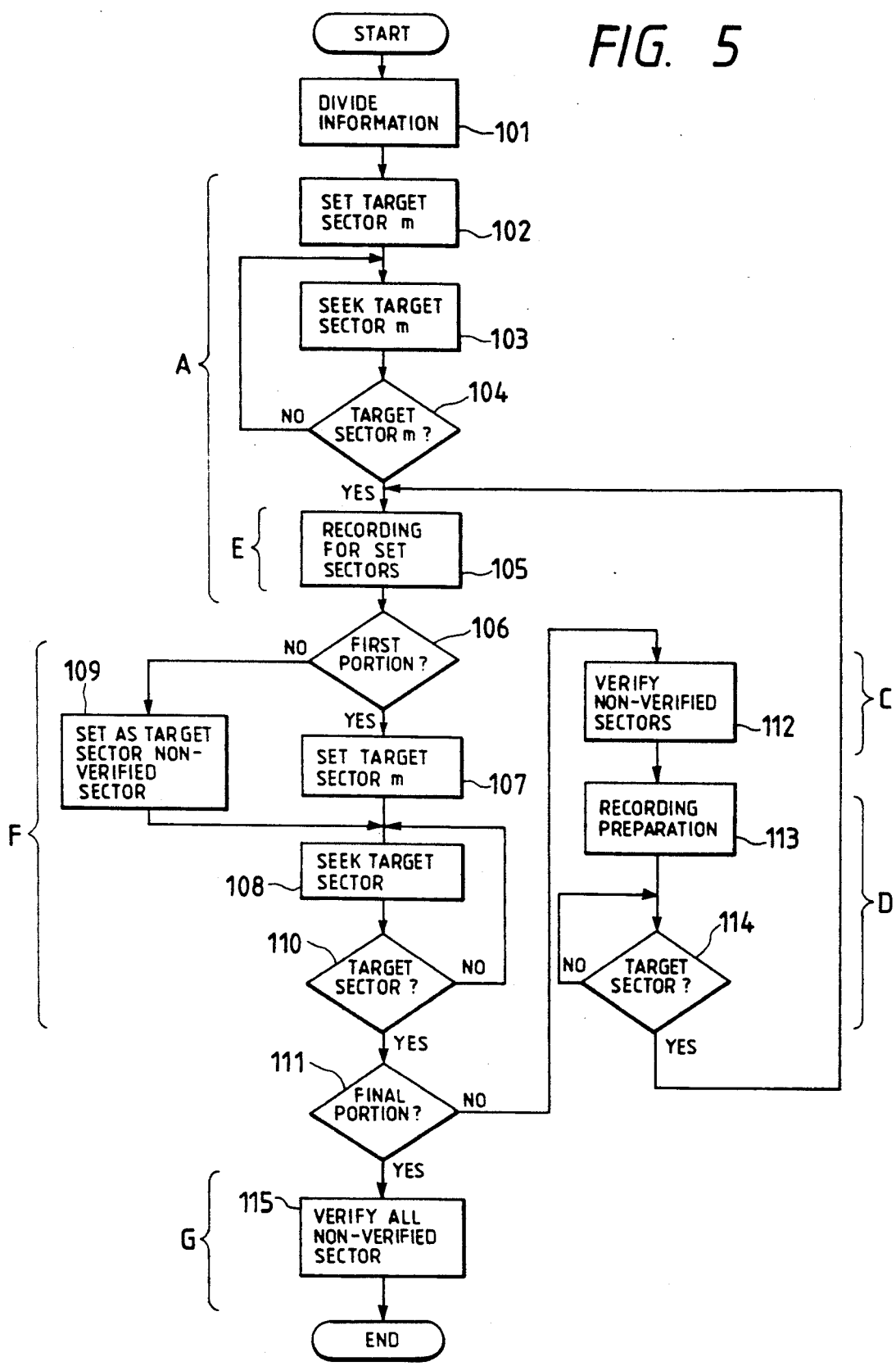
FIG. 5 is a flow chart showing the operation of the present invention.

FIG. 5 is a flow chart showing the above-described operation to be executed in the controller 3, where A to G respectively correspond to the processes A to G in FIG. 4. In FIG. 5, the operation starts with a step 101 to divide the information to be recorded into a plurality of portions, then followed by a step 102 to set as a target sector the first sector m in which the first portion is recorded. The step 102 is followed by a step 103 to seek for the target sector and then followed by a checking step 104. If the target sector is not found, the operational flow returns to the step 103. On the other hand, if the target is found, the operational flow advances to a step 105 to record data corresponding to the set sectors (≦64). After the execution of the step 105, the process advances to a step 106 to check whether the recorded data correspond to the first portion. If the answer of the step 106 is affirmative, the process goes to a step 107 to set the first sector m as the target sector, then followed by a step 108 for the seeking operation. If the answer of the step 106 is negative, the process goes to a step 109 to set as the target sector the head sector of the previously non-verified sectors. This is followed by the step 108. After the step 108, the process goes to a checking step 110. If the answer of the step 110 is negative, the operational flow returns to the step 108. On the other hand, if the answer of the step 110 is affirmative, the process proceeds to a step 111 to check whether the data to be recorded correspond to the final portion. If the answer of the step 111 is negative, the operational flow goes to a step 112 in which the verifying operation is made for the sectors except for the last sector or successive n sectors including the last sector and further for the sectors which have not been verified previously. The step 112 is followed by a step 113 to set as a target sector the head sector of the sectors corresponding to the next portion, then followed by a step 114 to check the target sector. If the answer of the step 114 is affirmative, the operational flow returns to the step 105. If the answer of the step 111 is affirmative, the process goes to a step 115 to verify the sectors corresponding to the final portion and further verify the previously non-verified sectors.

When the necessary time between verification completion and the preparation for the next recording corresponds to the time for rotation of n sectors, the verifying operation is performed for the sectors up to m+64−n. The data corresponding to the remaining n sectors are transferred to the buffer memory 9 so as to be verified together with the next data portions. In case the amount of data is large, the above-operation is repeatedly effected before the finally recorded data and the previously non-verified data are together verified. Thus, the seeking operation and the standby time at the start of recording after verification are not required to reduce the recording time.

It should be understood that the foregoing relates to only a single preferred embodiment of the present invention. Accordingly, the invention should be considered to cover all changes modifications, variations, combinations or equivalent arrangements, which do not constitute departures from the spirit and scope of the invention falling within

What is claimed is:

1. An information recording/reproducing apparatus with recorded data verification capability comprising:
recording means for recording information on a disc-like recording medium rotatable by rotating means;
reproducing means for reproducing the information recorded on said disc-like recording medium by said recording means; and
control means for controlling said recording means and said reproducing means so as to record the information on said disc-like recording medium and reproduce the information recorded thereon for verification of the recorded information, said control means dividing the information to be recorded into two or more portions so that a first division portion is successively recorded over a first group of a plurality of blocks successively formed circumferentially on said disc-like recording medium and then reproduced for verification before a second division portion is successively recorded over a second group of blocks which are consecutive to said first group of blocks and then reproduced for verification, the recording and reproduction being continuously effected up to a last division portion, wherein when verifying the first division portion through a penultimate division portion, only a final group of one or more blocks of a just recorded division portion are verified after recording a successive division portion together with blocks of the successive division portion other than a final group of one or more blocks of the successive division portion, and all blocks of the last division portion are verified together with non-verified blocks from said penultimate division portion.

2. An apparatus as claimed in claim 1, wherein said control means determines a number of non-verified blocks for each of the division portions so that a time required for rotation of said disc-like recording medium corresponding to the non-verified blocks of a division portion is longer than a time required for recording a successive division portion after completion of verification of a successive division portion.

3. An apparatus as claimed in claim 1, wherein said control means includes memory means to temporarily store data corresponding to non-verified blocks of a division portion until verification of a successive division portion.

* * * * *